(12) United States Patent
Tamura et al.

(10) Patent No.: US 10,156,278 B2
(45) Date of Patent: Dec. 18, 2018

(54) DYNAMIC DAMPER APPARATUS WITH RETAINING STRUCTURE

(71) Applicants: Honda Motor Co., Ltd., Tokyo (JP); YUSA CORPORATION, Washington Court House, OH (US)

(72) Inventors: Tsutomu Tamura, Nara (JP); Kishan Kari, Columbus, OH (US); Brian Welch, Grove City, OH (US)

(73) Assignees: HONDA MOTOR CO., LTD., Tokyo (JP); YUSA CORPORATION, Washington Court House, OH (US)

( * ) Notice: Subject to any disclaimer, the term of this patent is extended or adjusted under 35 U.S.C. 154(b) by 155 days.

(21) Appl. No.: 15/433,773

(22) Filed: Feb. 15, 2017

(65) Prior Publication Data

US 2018/0231091 A1    Aug. 16, 2018

(51) Int. Cl.
| | |
|---|---|
| *F16M 13/00* | (2006.01) |
| *F16F 7/108* | (2006.01) |
| *F16F 15/02* | (2006.01) |
| *B60K 17/16* | (2006.01) |

(52) U.S. Cl.
CPC .............. *F16F 7/108* (2013.01); *B60K 17/16* (2013.01); *F16F 15/022* (2013.01)

(58) Field of Classification Search
CPC combination set(s) only.
See application file for complete search history.

(56) References Cited

U.S. PATENT DOCUMENTS

| | | | |
|---|---|---|---|
| 5,123,624 A | 6/1992 | Kurata et al. | |
| 6,308,810 B1 | 10/2001 | Kuwayama | |
| 6,450,487 B1 | 9/2002 | Kuwayama | |
| 6,499,730 B1 | 12/2002 | Kuwayama et al. | |
| 6,682,060 B2 | 1/2004 | Kato et al. | |
| 6,793,050 B2* | 9/2004 | Nylander ............ | F16F 15/1442 188/379 |
| 7,942,229 B2 | 5/2011 | Steyer et al. | |
| 7,980,536 B2* | 7/2011 | Haregoppa ............... | B06B 3/00 188/378 |
| 8,038,540 B2* | 10/2011 | Hoeks ................. | F16F 15/1442 188/379 |
| 8,136,621 B2 | 3/2012 | Steyer et al. | |
| 8,136,646 B2 | 3/2012 | Kuwayama | |
| 8,342,821 B2 | 1/2013 | Prieto | |
| 2007/0251783 A1* | 11/2007 | Kuwayama ............. | F16F 7/108 188/380 |
| 2008/0034918 A1* | 2/2008 | Manzoor ................. | F16F 7/108 74/574.4 |
| 2008/0143029 A1* | 6/2008 | Sato ......................... | F16F 1/38 267/141.1 |

(Continued)

FOREIGN PATENT DOCUMENTS

DE      102011001174 A1     9/2012

*Primary Examiner* — Monica E Millner
(74) *Attorney, Agent, or Firm* — Kenealy Vaidya LLP (57) ABSTRACT

A dynamic damper for dampening vibrations of a vehicle includes a cylindrical mass member with circumferentially arranged protrusions, a coaxial collar member including an annular ridge on an outer surface having a larger diameter than a body of the collar member, and a coaxial elastic member disposed between the cylindrical mass member and the collar member. The protrusions of the mass member can extend over an outer surface of the annular ridge of the collar member.

20 Claims, 8 Drawing Sheets

(56) References Cited

U.S. PATENT DOCUMENTS

| | | | |
|---|---|---|---|
| 2009/0072458 A1* | 3/2009 | Rodecker | F16F 7/108 267/141 |
| 2011/0049776 A1* | 3/2011 | Gustavsson | F16F 7/108 267/140.11 |
| 2015/0131982 A1* | 5/2015 | Starns | F16F 3/0876 396/7 |
| 2016/0169314 A1* | 6/2016 | Choi | F16F 7/108 188/380 |
| 2017/0268601 A1* | 9/2017 | Kim | F16F 7/108 |

* cited by examiner

DYNAMIC DAMPER APPARATUS WITH RETAINING STRUCTURE

BACKGROUND

The disclosed subject matter relates to a dynamic damper apparatus with retaining structure. More particularly, the disclosed subject matter relates to apparatus that dynamically dampen vibrations on a vehicle.

Damping vibrations in vehicles can be performed at various locations to suppress resonances of horizontal and vertical vibrations. Dampers can be apparatuses that suppress a resonance that occurs at a structural point of the vehicle. For example, a damper can be used on an engine mount, a transmission mount, or a chassis, where vibrations may be generated.

SUMMARY

Some embodiments are directed to a dynamic damper for dampening vibrations of a vehicle. According to one aspect, a dynamic damper can include a cylindrical mass member including a plurality of protrusions arranged circumferentially on a surface of the cylindrical mass member, a collar member, disposed coaxially with and partially through the cylindrical mass member, including an annular ridge arranged circumferentially on an outer surface of the collar member that has a larger diameter than a body of the collar member, and an elastic member disposed coaxially with the cylindrical mass member and disposed between the cylindrical mass member and the collar member. The plurality of protrusions can extend over an outer surface of the annular ridge of the collar member.

According to another aspect, a damping assembly for a vehicle differential is movably supported by a frame member of the vehicle. The damping assembly can include a resilient member connecting the differential to the frame member of the vehicle and a dynamic damper connected to the differential. The dynamic damper can include a cylindrical mass member including a plurality of protrusions arranged circumferentially on a surface of the cylindrical mass member, a collar member, disposed coaxially with and partially through the cylindrical mass member, including an annular ridge arranged circumferentially on an outer surface of the collar member that has a larger diameter than a body of the collar member, and an elastic member disposed coaxially with the cylindrical mass member and disposed between the cylindrical mass member and the collar member. At least a portion of each of the plurality of protrusions can extend over an outer surface of the annular ridge of the collar member.

According to yet another aspect, a dynamic damper for dampening vibrations of a vehicle structure can include a mass member a collar member and an elastic member. The mass member can include an inner surface that defines a through-hole and a plurality of projections extending inwardly from the inner surface. The collar member can extend through the through-hole of the mass member. The collar member can include a body and a bulge. The body can include an outer surface, a first end extending beyond the mass member, a second end, and a through-hole configured to receive a fastener that connects the dynamic damper to the vehicle structure. The bulge can be located on the second end, can project outwardly from the outer surface, and can overlap at least a portion of each of the projections.

BRIEF DESCRIPTION OF THE DRAWINGS

The disclosed subject matter of the present application will now be described in more detail with reference to exemplary embodiments of the apparatus and method, given by way of example, and with reference to the accompanying drawings, in which.

DETAILED DESCRIPTION OF EXEMPLARY EMBODIMENTS

A few inventive aspects of the disclosed embodiments are explained in detail below with reference to the various figures. Exemplary embodiments are described to illustrate the disclosed subject matter, not to limit its scope, which is defined by the claims. Those of ordinary skill in the art will recognize a number of equivalent variations of the various features provided in the description that follows.

The effectiveness of dynamic dampers can be negatively affected in situations where a rubber or elastic element within the damper degrades or fails due to higher input loads beyond those specified for the apparatus. A failure of a damper can cause a weighted dynamic damper mass to break apart from the dynamic damper apparatus, causing a potential safety concern to other drivers and vehicles on a road. Thus, it may be beneficial to address at least one of the issues identified above. In addition, it may be beneficial or necessary in the context of a vehicle to suppress resonances that can cause vibrations while impeding potential safety concerns due to failure or breakage of a damper.

I. Dynamic Damper

Figure 1:
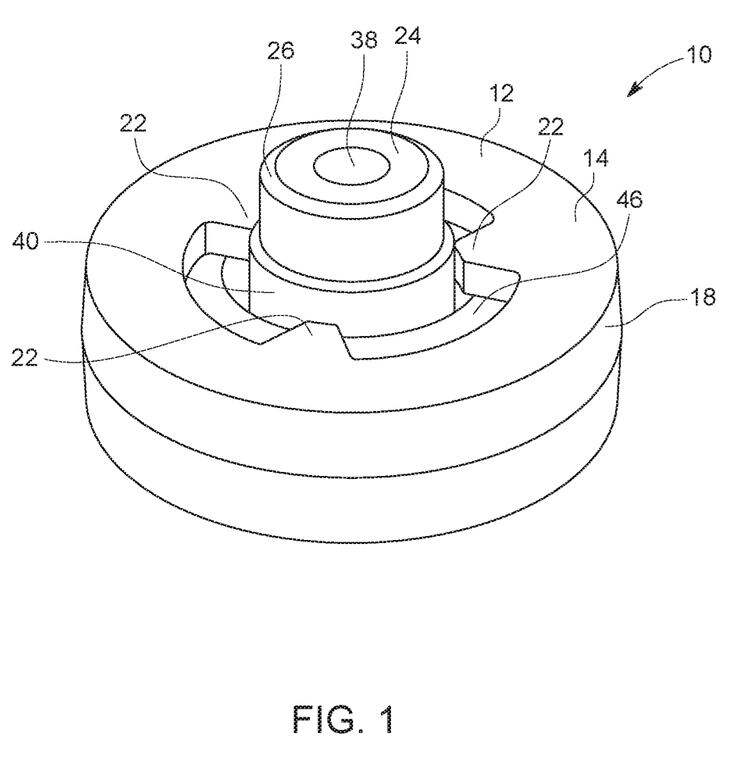
FIG. 1 is a perspective view of an exemplary dynamic damper in accordance with the disclosed subject matter.

FIG. 1 is a perspective view of an exemplary dynamic damper in accordance with the disclosed subject matter. A dynamic damper 10 of the embodiments can be formed as a unitary or multi-part body and can include a mass member 12, a collar member 24, and an elastic member 40. In one embodiment, the mass member 12 can be formed as, but is not limited to, a cylindrical member, and hereafter will be referred to as the cylindrical mass member 12. The elastic member 40 can be formed from a rubber elastic body and be disposed inside but partially extend outside the cylindrical mass member 12. The elastic member 40 can be coaxially arranged with respect to the cylindrical mass member 12 and the collar member 24. The collar member 24 can include a cylindrical body 26 and can be formed of a rigid material, metal, etc. The collar member 24 can be coaxially disposed with and extend through a through-hole 23 of the cylindrical mass member 12. The cylindrical mass member 12, the elastic member 40, and the collar member 24 can be configured in any appropriate shapes and assembled in any appropriate arrangement that can provide the damping functions described herein.

Figure 2:
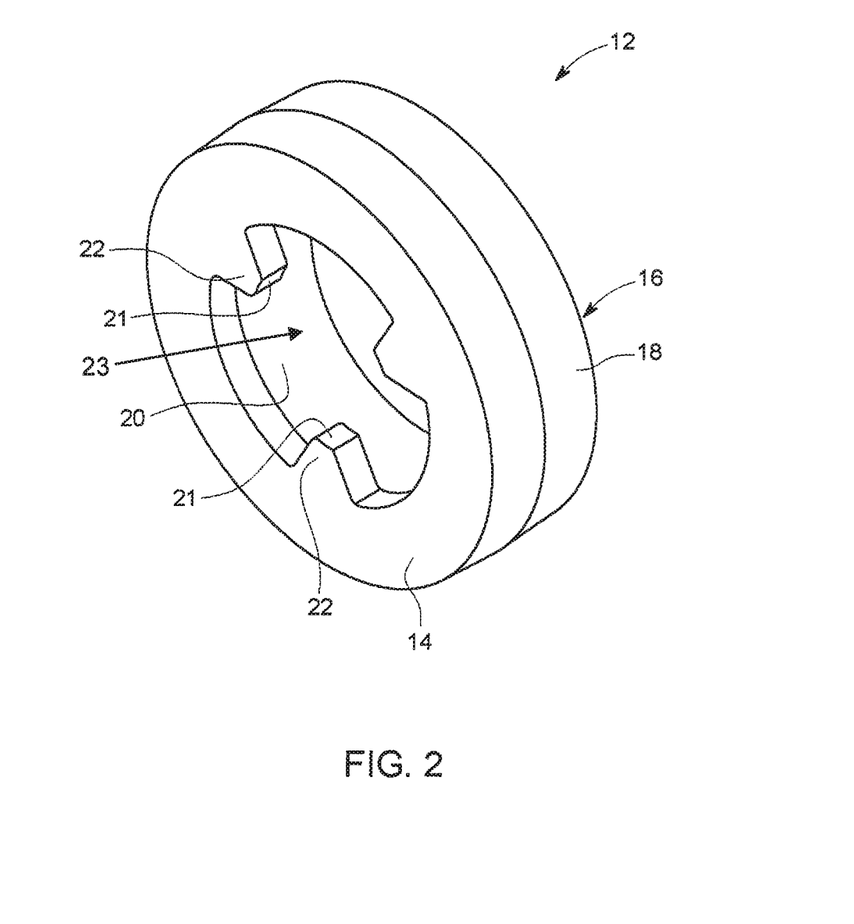
FIG. 2 is a perspective view of an exemplary cylindrical mass member of the dynamic damper of FIG. 1.

FIG. 2 is a perspective view of the exemplary cylindrical mass member 12 of the dynamic damper of FIG. 1. The cylindrical mass member 12 can be a thick-walled cylindrical element having an axial length shorter than that of the collar member 24 and can include a first side 14, a second side 16 (not shown in FIG. 2), a circumferential outer surface 18, and a circumferential inner surface 20. The inner surface 20 can define a through-hole 23 in a longitudinal direction of the cylindrical mass member 12. The cylindrical mass member 12 can include one or more protrusions, or projections, 22 that can extend inwardly from the inner surface 20. In one embodiment, three protrusions 22, each having a trapezoidal cross-section, can be formed and arranged circumferentially at equal intervals on the circumferential inner surface 20 while protruding radially inward and extending axially between the opposite ends thereof. In the embodiments, each protrusion 22 can include an inner arcuate surface 21 that lies on a circle having a diameter that has a larger diameter than the diameter of the collar member body 26. In other embodiments, the cross-sectional shape of each protrusion 22 may be circular, rectangular, crested, triangular, or other polygonal shapes.

The exemplary cylindrical mass member 12 can be formed of metallic, semi-metallic, or other rigid material with any appropriate shape to function with the dynamic damper 10. For example, the cylindrical mass member 12 can be formed by a cold or hot forging process, a sintering process, a press bending process, etc. However, the embodiments intend to include or otherwise cover any process that can form material for the cylindrical mass member 12.

Figure 3:
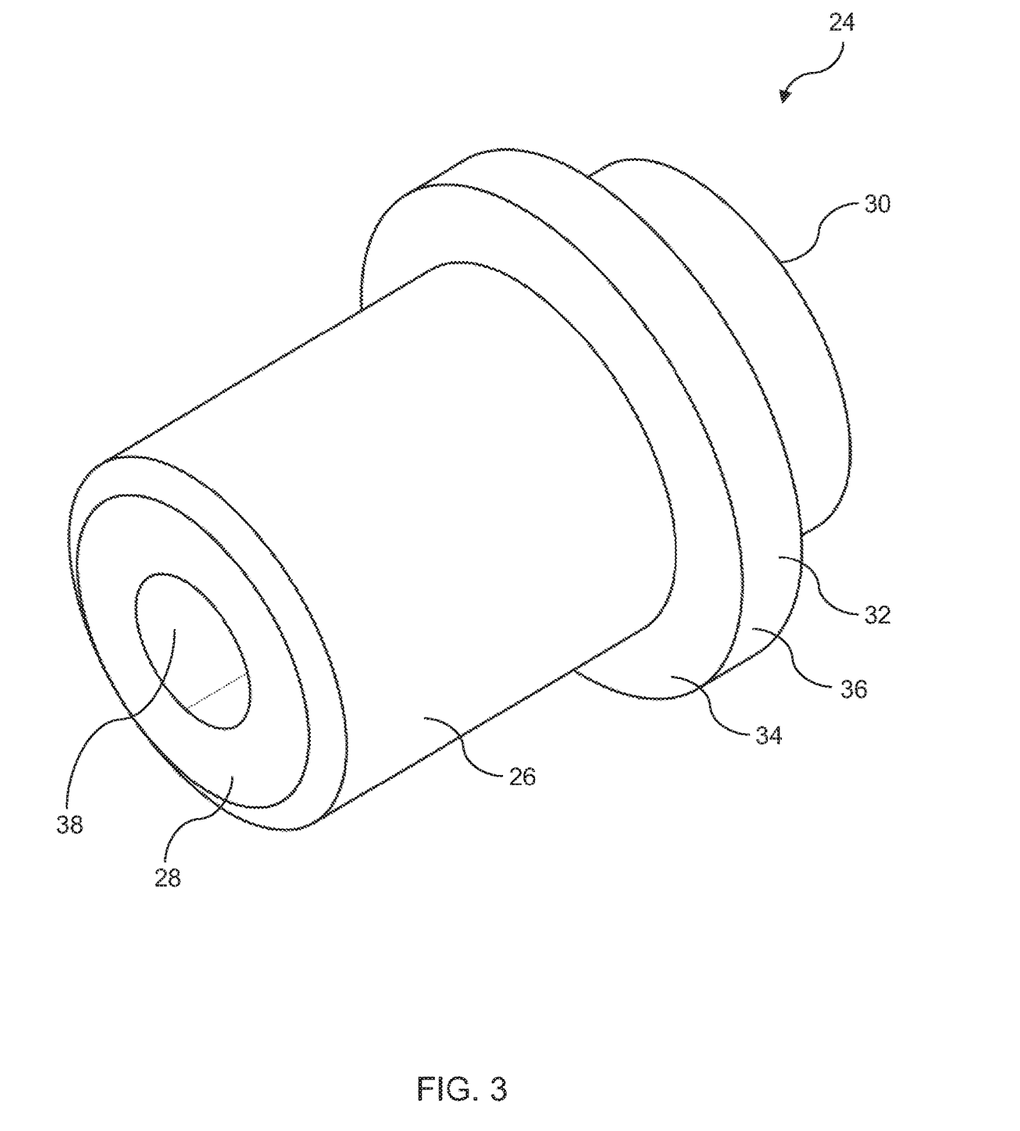
FIG. 3 is a perspective view of an exemplary collar member of the dynamic damper of FIG. 1.

FIG. 3 is a perspective view of the exemplary collar member 24 of the dynamic damper 10 of FIG. 1. The collar member 24 can be formed in, but is not limited to, a cylindrical shape with a first end 28, a second end 30, and an axial length longer than an axial length of the cylindrical mass member 12. The collar member 24 can include the cylindrical body 26 formed with a through-hole 38 disposed in a longitudinal direction of the collar member 24. The collar member 24 can also include an annular ridge, or bulge, 32 located on the second end 30, which can project outwardly from an outer circumferential surface of the body 26. The annular ridge 32 can include a circumferential wall 36 and an outer surface 34 that can extend radially outward from the body 26 to a predetermined distance.

Figure 4:
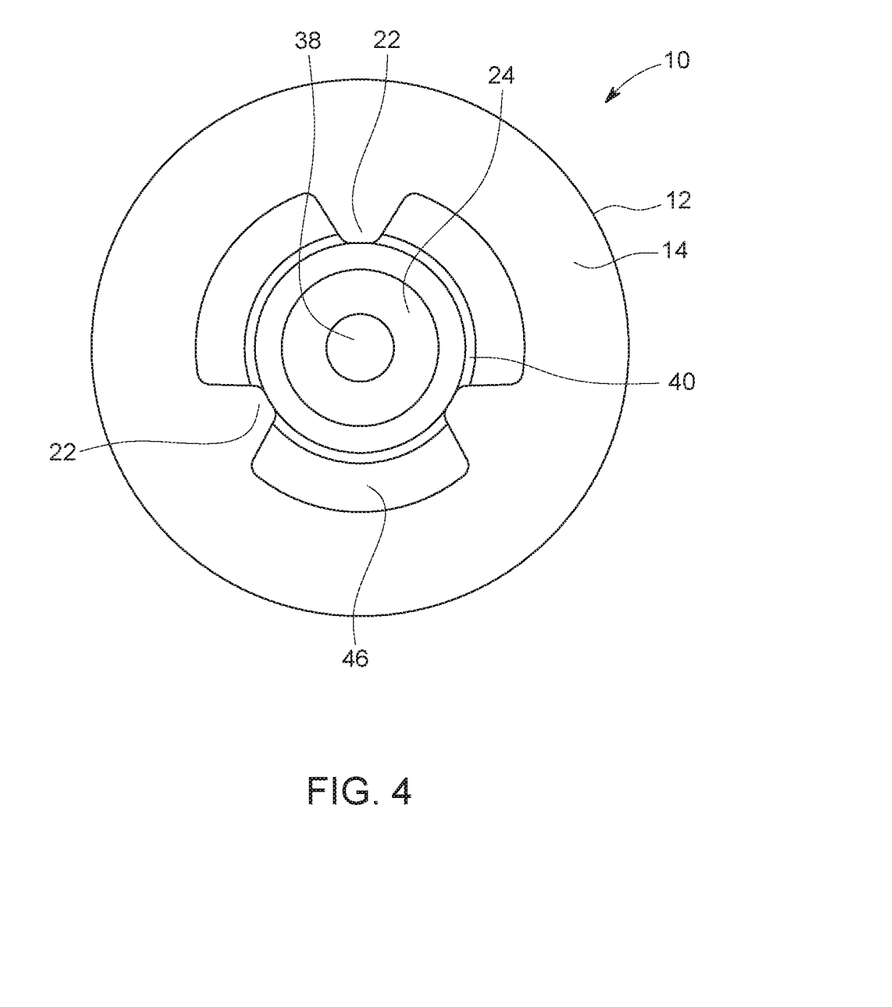
FIG. 4 is a plan view of the dynamic damper of FIG. 1.

FIG. 4 is a plan view of the dynamic damper 10 of FIG. 1. The cylindrical mass member 12 includes the first side 14 and the plurality of protrusions 22 arranged circumferentially on the inner surface 20 of the cylindrical mass member 12. The collar member 24 is disposed coaxially with and partially through the cylindrical mass member 12 and can be arranged so that the annular ridge 32 can overlap at least a portion of each of the projections 22. The elastic member 40 can be disposed coaxially inside the cylindrical mass member 12 with at least a portion of the elastic member 40 having an effective diameter larger than the circle formed by the inner arcuate surfaces 21 of the protrusions 22. The annular ridge 32 is arranged circumferentially on the body 26 of the collar member and has a larger diameter than a diameter of the body 26 of the collar member. In the embodiments, the plurality of protrusions 22 can extend over the outer surface 34 of the annular ridge 32. The elastic member 40 can be disposed coaxially with the cylindrical mass member 12 and can be disposed between the cylindrical mass member 12 and the collar member 24. Exemplary embodiments are intended to include the elastic member 40 connected directly, or indirectly, to each of the cylindrical mass member 12 and the collar member 24. In an embodiment, the elastic member 40 can be arranged at least partially around the outer surface 34 of the collar member 24, and the plurality of protrusions 22 can project over at least a portion of the elastic member 40. In other embodiments, the elastic member 40 can be disposed circumferentially around the annular ridge 32, which is spaced apart from the inner surface 20 of a main body of the cylindrical mass member 12. Further, the elastic member 40 can be disposed circumferentially around the collar member 24 that is spaced apart from the inner surface 20 of a main body of the cylindrical mass member 12. In an embodiment, the first end 28 of the collar member 24 can extend beyond the first side 14 of the cylindrical mass member 12 through the circle defined by the arcuate surfaces 21 of the plurality of protrusions 22, and the second end 30 of the collar member 24 can be disposed within the cylindrical mass member 12. In other embodiments, a portion of the elastic member 40 can extend from the body 26 of the collar member 24 to the inner surface 20 of the cylindrical mass member 12 thereby separating the collar member 24 from the cylindrical mass member 12 by a predefined distance.

II. Damping Assembly

Figure 5:
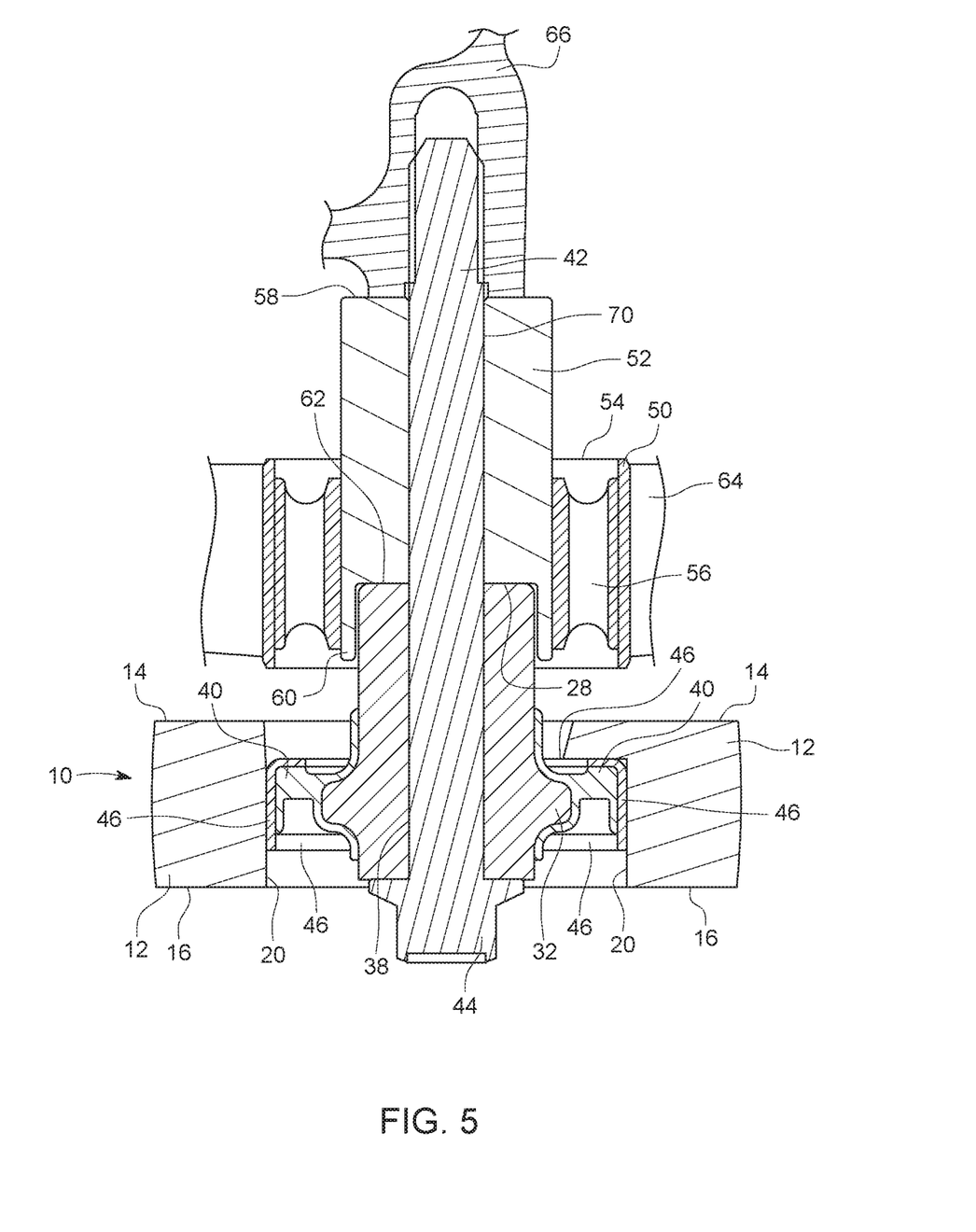
FIG. 5 is cross-sectional view of a damping assembly in accordance with the disclosed subject matter.

FIG. 5 is cross-sectional view of a damping assembly in accordance with the disclosed subject matter. The damping assembly can include the dynamic damper 10 and a cylindrical resilient member 50, which can connect a vehicle differential 66 and the dynamic damper 10 to a frame member 64 of the vehicle. The resilient member 50 can be disposed coaxially around a cylindrical sleeve member 52. The sleeve member 52 can receive the collar member 24 in a recessed portion 62 at a second end 60 and can abut or be secured to the differential 66 at a first end 58. In some embodiments, a mechanical fastener 42 can connect or secure the dynamic damper 10 and resilient member 50 to the differential 66.

Figure 6:
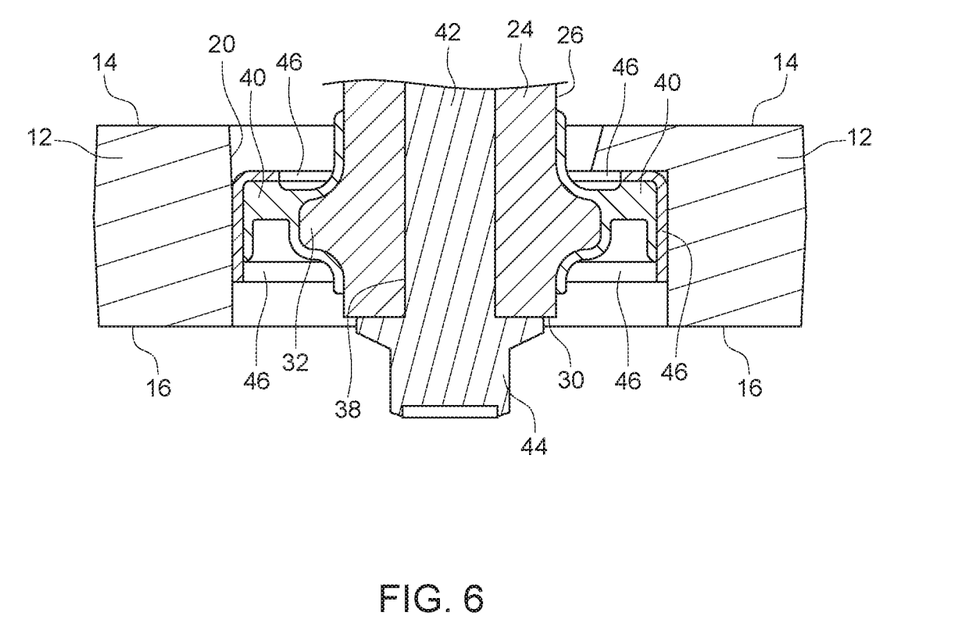
FIG. 6 is a detailed partial cross-sectional view of the damping assembly of FIG. 5.

FIG. 6 is a detailed partial cross-sectional view of the damping assembly of FIG. 5. In FIG. 6, the dynamic damper 10 can include the cylindrical mass member 12, the collar member 24, and the elastic member 40. The elastic member 40 can be coaxially disposed inside the cylindrical mass member 12 and partially outside of the cylindrical mass member 12. The collar member 24 can include the cylindrical body 26 and can be formed of a rigid material, metal, etc. and can be coaxially disposed with and partially inserted through the cylindrical mass member 12. The cylindrical mass member 12 can be a thick-walled cylindrical element having an axial length shorter than that of the collar member 24 and can include the first side 14, the second side 16, the circumferential outer surface 18, and the circumferential inner surface 20. The collar member 24 can be formed as a cylindrical shape with the first end 28, the second end 30, and an axial length longer than an axial length of the cylindrical mass member 12. The collar member 24 can include the cylindrical body 26 formed with the through-hole 38 disposed in a longitudinal direction of the collar member 24. The collar member 24 can also include the annular ridge 32, which can be formed on the outer circumference of the body 26. The annular ridge 32 can extend radially outward from the body 26 to a predetermined distance. The collar member 24 can be disposed coaxially with and extend partially through the cylindrical mass member 12 through-hole 23.

The plurality of protrusions 22 (see FIG. 2), each having a trapezoidal cross-section, can be formed and arranged circumferentially at equal intervals on the circumferential inner surface 20 of the cylindrical mass member 12 while protruding radially inward and extending axially between the opposite ends thereof. In the embodiments, each protrusion 22 includes the inner arcuate surface 21 that lies on a circle having a diameter that has a larger diameter than the collar member body 26 diameter. In other embodiments, the cross-sectional shape of each protrusion 22 may be circular, rectangular, crested, triangular, or other polygonal shapes. The plurality of protrusions 22 can extend over an outer surface of the annular ridge 32 such that at least a portion of each protrusion 22 and the annular ridge 32 overlap.

The elastic member 40 can be disposed coaxially within the cylindrical mass member 12 and coaxially around the collar member 24 and can connect or secure the cylindrical mass member 12 to the collar member 24. In an embodiment, the elastic member 40 can be arranged at least partially around the outer surface of the collar member 24, and the plurality of protrusions 22 can project over at least a portion of the elastic member 40. The damping assembly can also include a connection ring 46, which can attach to the elastic member 40. The connection ring 46 can be disposed between and/or connected to the cylindrical mass member 12 and the collar member 24. The plurality of protrusions 22 can be arranged to project over at least a portion of the connection ring 56. In other embodiments, the elastic member 40 can be disposed circumferentially around the annular ridge 32 that is spaced apart from the inner surface 20 of a main body of the cylindrical mass member 12, and the elastic member 40 can be disposed circumferentially around the collar member 24 that is spaced apart from the inner surface 20 of a main body of the cylindrical mass member 12.

FIG. 5 further illustrates the resilient member 50 that can include an annular bushing member 56 that is enclosed within a housing 54. The bushing member 56 can be formed from materials such as, but not limited to, rubber, synthetic rubber, urethane, polyurethane, etc. or any resilient material that can function to dampen vibration while allowing a limited amount of movement. The bushing member 56 can be disposed coaxially around and secured against the cylindrical sleeve member 52. The sleeve member 52 can include the first end 58, which abuts or is otherwise secured against the differential 66 and the second end 60 that can include the recessed portion 62. The recessed portion 62 can receive the first end 28 of the collar member 24 that extends outside of the cylindrical mass member 12 in a vertical interlocking arrangement. In other words, the cylindrical sleeve member 52 can be disposed coaxially around an end of the collar member 24. The housing 54 of the bushing member 56 can connect or secure the resilient member 50 to the frame member 64 of a vehicle in any appropriate manner, such as but not limited to mechanical fasteners, glue, epoxy, welding, pressure fitting, etc.

In an embodiment, the first end 58 of the sleeve member 52 can be connected to the differential 66 in any appropriate manner, such as but not limited to mechanical fasteners, glue, epoxy, welding, pressure fitting, etc. In other embodiments, the sleeve member 52 can include a through-hole 70 that can receive the mechanical fastener 42, which can be a threaded bolt with a head 44, rod, etc. The sleeve member 52 can also connect to the dynamic damper 10 to the differential 66 in any appropriate manner, such as but not limited to mechanical fasteners, glue, epoxy, welding, pressure fitting, etc. In other embodiments, the fastener 42 may be inserted into the through hole 38 of the collar member 24, where the fastener head 44 is flanged to seat against the second end 30 of the collar member 24, and thereby connect the dynamic damper 10 to the cylindrical resilient member 50 and connect the cylindrical resilient member 50 to the differential 66. The fastener 42 may connect to the differential 66 in any appropriate manner, such as but not limited to mechanical fasteners, glue, epoxy, welding, pressure fitting, etc.

Figure 7:
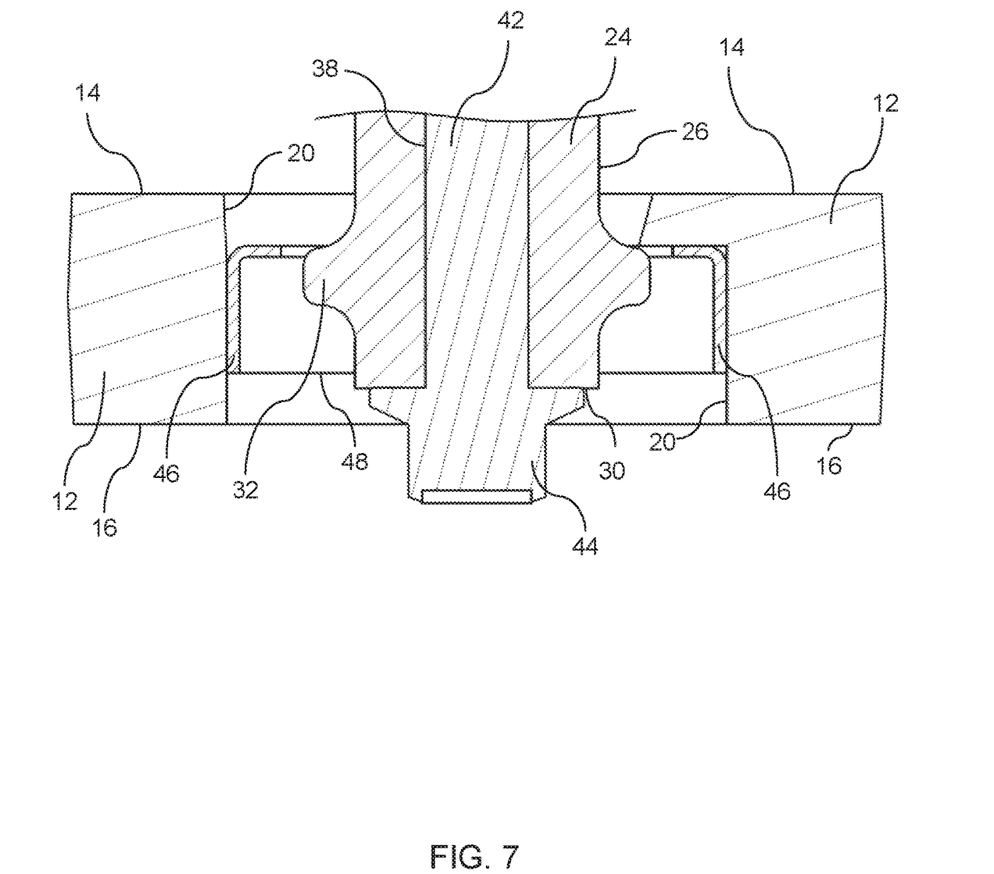
FIG. 7 is a detailed partial cross-sectional view of the damping assembly of FIG. 6 after a failure of an elastic member.

FIG. 7 is a detailed partial cross-sectional view of the damping assembly of FIG. 6 after a failure of an elastic member. After an extended use of the exemplary damper assembly on a vehicle, the elastic member 40 may break and fail due to one or more causes such as submitting the damper assembly to higher input loads than permitted by specifications. In a failure scenario, the elastic member 40 may break into pieces and fall out of the dynamic damper 10. Without the elastic member 40 to provide spacing between the cylindrical mass member 12 and the collar member 24, the weight of the cylindrical mass member 12 can force the cylindrical mass member 12 away from the differential 66 towards the second end 30 of the collar member 24. Because the protrusions 22 extend over the outer surface 34 of the annular ridge 32, this movement forces the protrusions against the annular ridge 32, thereby impeding the cylindrical mass member 12 from falling off of the damper assembly.

Figure 8:
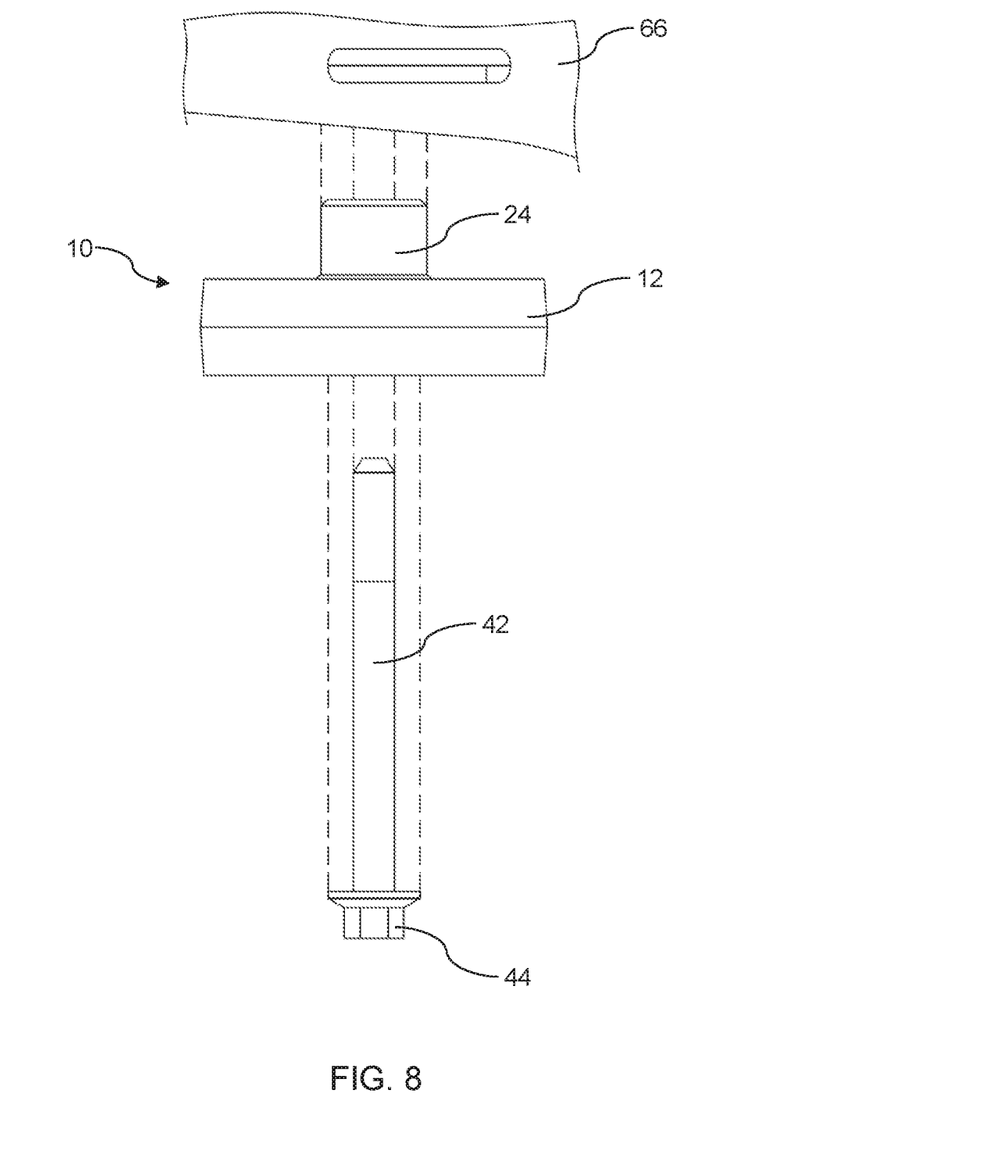
FIG. 8 is an exploded side view of the dynamic damper and fastener of the damping assembly of FIG. 5.

FIG. 8 is an exploded side view of the dynamic damper 10 and the fastener 42 of the damping assembly of FIG. 5. In an alternative embodiment illustrated in FIG. 8, the resilient member 50 is not arranged between the dynamic damper 10 and the differential 66. The through-hole 38 of the collar member 24 can coaxially receive the fastener 42, which thereby fastens the cylindrical mass member 12 and elastic member 40 to the differential 66.

III. Operation of the Damper Assembly

A method of operation of a damping assembly for damping the vehicle differential 66 that is movably supported by the frame member 64 of the vehicle can include a first step of connecting the cylindrical resilient member 50 to the differential 66 and to the frame member 64 of the vehicle. A next step can include providing a dynamic damper by arranging the plurality of protrusions 22 circumferentially on the inner surface 20 of the cylindrical mass member 12, arranging the annular ridge 32 circumferentially on an outer surface of the collar member 24 (that has a larger diameter than the body 26 of the collar member 24), disposing the collar member 24 coaxially with and partially through the cylindrical mass member 12, disposing the elastic member 40 coaxially with the cylindrical mass member 12, connecting the cylindrical mass member 12 to the collar member 24 with the elastic member 40, extending the plurality of protrusions 22 over the outer surface 34 of the annular ridge 32, and connecting the dynamic damper 10 to the differential 66.

IV. Alternative Embodiments

Exemplary embodiments are intended to include or otherwise cover the collar member 24 having a plurality of protrusions and the cylindrical mass member 12 having a reduced diameter of a first side through hole such that the diameter of the collar member protrusions extend beyond the diameter of the first side through hold diameter of the cylindrical mass member.

Exemplary embodiments are further intended to cover omission of any one or both of resilient member and fastener.

While the subject matter has been described in detail with reference to exemplary embodiments thereof, it will be apparent to one skilled in the art that various changes can be made, and equivalents employed, without departing from the scope of the invention. All related art references discussed in the above Background section are hereby incorporated by reference in their entirety.

What is claimed is:

1. A dynamic damper for dampening vibrations of a vehicle, comprising:

a cylindrical mass member including a plurality of protrusions arranged circumferentially on a surface of the cylindrical mass member;

a collar member, disposed coaxially with and partially through the cylindrical mass member, including an annular ridge arranged circumferentially on an outer surface of the collar member that has a larger diameter than a body of the collar member; and an elastic member disposed coaxially with the cylindrical mass member and disposed between the cylindrical mass member and the collar member, wherein the plurality of protrusions extend over an outer surface of the annular ridge.

2. The dynamic damper of claim 1, further comprising:
a connection ring disposed between the cylindrical mass member and the collar member,
wherein at least a portion of each of the plurality of protrusions projects over a portion of the connection ring.

3. The dynamic damper of claim 1, wherein each of the plurality of protrusions includes an inner arcuate surface that lies on a circle having a diameter that has a larger diameter than the collar member body diameter but a smaller diameter than the annular ridge diameter.

4. The dynamic damper of claim 1, wherein the elastic member is arranged at least partially around the outer surface of the collar member and the plurality of protrusions project over at least a portion of the elastic member.

5. The dynamic damper of claim 2, wherein the elastic member is disposed between the connection ring and the collar member.

6. The dynamic damper of claim 1, wherein the collar member includes a through hole disposed in a longitudinal direction of the collar member.

7. The dynamic damper of claim 1, wherein the elastic member is disposed circumferentially around the annular ridge that is spaced apart from an inner surface of a main body of the cylindrical mass member.

8. The dynamic damper of claim 1, wherein the elastic member is disposed circumferentially around the collar member that is spaced apart from an inner surface of a main body of the cylindrical mass member.

9. The dynamic damper of claim 1, wherein at least a portion of one end of the body of the collar member extends beyond a first side of the cylindrical mass member through a circle defined by the arcuate surfaces of the plurality of protrusions, and a second end of the body of the collar member is disposed within the cylindrical mass member.

10. The dynamic damper of claim 1, wherein at least a portion of the elastic member extends from an outer surface of the collar member to the inner surface of the cylindrical mass member.

11. A damping assembly for a vehicle differential that is movably supported by a frame member of the vehicle, the damping assembly comprising:
a resilient member connecting the differential to the frame member of the vehicle; and
a dynamic damper connected to the differential, the dynamic damper including:
a cylindrical mass member including a plurality of protrusions arranged circumferentially on a surface of the cylindrical mass member;
a collar member, disposed coaxially with and partially through the cylindrical mass member, including an annular ridge arranged circumferentially on an outer surface of the collar member that has a larger diameter than a body of the collar member; and
an elastic member disposed coaxially with the cylindrical mass member and disposed between the cylindrical mass member and the collar member,
wherein at least a portion of each of the plurality of protrusions extends over an outer surface of the annular ridge.

12. The damping assembly of claim 11, wherein the resilient member includes a bushing disposed coaxially around a cylindrical sleeve member.

13. The damping assembly of claim 12, wherein the cylindrical sleeve member is disposed coaxially around an end of the collar member.

14. The damping assembly of claim 11, further comprising a mechanical fastener that connects the dynamic damper to the cylindrical resilient member and connects the resilient member to the differential.

15. The damping assembly of claim 11, further comprising:
a connection ring disposed between the cylindrical mass member and the collar member,
wherein at least a portion of each of the plurality of protrusions projects over a portion of the connection ring.

16. The damping assembly of claim 11, wherein each of the plurality of protrusions includes an inner arcuate surface that lies on a circle having a diameter larger than the collar member body diameter but a smaller than the annular ridge diameter.

17. The damping assembly of claim 11, wherein the elastic member is arranged at least partially around the outer surface of the collar member and at least a portion of each of the plurality of protrusions projects over at least a portion of the elastic member.

18. The damping assembly of claim 15, wherein the elastic member is attached to the connection ring.

19. The damping assembly of claim 11, wherein the elastic member is disposed circumferentially around the annular ridge that is spaced apart from an inner surface of a main body of the cylindrical mass member, and
the elastic member is disposed circumferentially around the collar member that is spaced apart from an inner surface of a main body of the cylindrical mass member.

20. A dynamic damper for dampening vibrations of a vehicle structure, comprising:
a mass member including an inner surface that defines a through-hole, and a plurality of projections extending inwardly from the inner surface;
a collar member extending through the through-hole of the mass member, the collar including,
a body including an outer surface, a first end extending beyond the mass member, a second end, and a through-hole configured to receive a fastener that connects the dynamic damper to the vehicle structure, and
a bulge being located on the second end, projecting outwardly from the outer surface, and overlapping at least a portion of each of the projections; and
an elastic member disposed between the mass member and the collar member.

* * * * *